United States Patent [19]
Lloyd

[11] Patent Number: 5,482,120
[45] Date of Patent: Jan. 9, 1996

[54] METHOD AND APPARATUS FOR REMOVING PLANT STALKS

[76] Inventor: Drew Lloyd, 119 Mae Ave., Floydada, Tex. 79235

[21] Appl. No.: 184,579

[22] Filed: Jan. 21, 1994

[51] Int. Cl.$^6$ ........................................... A01B 45/02
[52] U.S. Cl. ........................ 172/21; 172/574; 172/575
[58] Field of Search ............................ 56/14.3, 14.5, 56/119, 327.1; 171/26, 27, 28, 53, 55, 56, 57, 59, 61, 64, 65; 172/555, 21, 22, 574, 575, 576, 762, 763, 773, 774, 734; 37/301, 302

[56] References Cited

U.S. PATENT DOCUMENTS

| | | |
|---|---|---|
| 1,185,785 | 6/1916 | Ferguson . |
| 2,651,905 | 9/1953 | Suhlweter ........................... 172/575 |
| 3,181,616 | 5/1965 | Oppel ................................. 171/58 |
| 3,419,084 | 12/1968 | Barows et al. ..................... 171/58 |
| 3,454,099 | 7/1969 | Wells .................................. 171/58 |
| 3,815,266 | 6/1974 | Schmitz et al. .................... 37/302 |
| 3,898,752 | 8/1975 | Ulve ................................... 171/58 |
| 4,445,557 | 5/1984 | Peters, III .......................... 171/58 X |
| 4,483,401 | 11/1984 | Robertson .......................... 111/139 X |
| 4,779,684 | 10/1988 | Schultz .............................. 172/575 X |
| 5,337,832 | 8/1994 | Bassett .............................. 172/744 X |

*Primary Examiner*—Eric K. Nicholson
*Assistant Examiner*—Robert Pezzuto
*Attorney, Agent, or Firm*—Novak Druce Herrmann Burt

[57] ABSTRACT

Apparatus and method for pulling plant stalks from the ground without severing the stalk at the point of engagement. The pulling action is accomplished with pairs of disks configured to engage the other near each's circumference. An upward pulling action is created by the disks because the disks initially come together, pinching the stalks therebetween, at a lower most position. As the disks roll in response to their traversing movement across the ground and the cleat's engagement with the ground, the pinch point between the disks and the stalk revolves upward producing a pulling action upon the stalk. The advantageous pulling action of the invention is accomplished in part by the novel orientation of the disks, one to the other, and the angles of engagement between the disks, the stalks and the ground during operation.

20 Claims, 5 Drawing Sheets

METHOD AND APPARATUS FOR REMOVING PLANT STALKS

FIELD OF THE INVENTION

This invention relates generally to agricultural equipment and more particularly to an apparatus and method for pulling plant stalks from the ground.

BACKGROUND INFORMATION

Disked stalk pullers are known within the agricultural field. There are, however, some deficiencies among known stalk pullers. In some examples of known disk pullers, the support members that connect the disks to the tool bars are individually bolted to the tool bar through the use of collars. These collars are intended to allow relative vertical motion of the support members relative to the tool bars for the purpose of adjust the distance the disks extend below the tool bar. As a result, the connection at the collar may loosen thereby allowing a disk to shift vertically with respect to the tool bar. This makes it difficult for the correct amount of overlap between the disks to be established and maintained.

Referring to FIG. 6(b), an undesirable orientation of the disks is illustrated and which is known in the field. If a pinch point between the disks occurs much more than one-half inch up the interior face from the lower tip (circumferential edge) of the lower (second) disk, then a substantial bend will be required of the plant stalk as it is engaged by the pulling disks. The greater the bend, the more likely the stalk is to snap and break. The breakage is not desired because the root system of the stalk is then left in the ground, unpulled. This results in an incomplete removal of the stalks from the field.

Still further, it is known within the art to utilize a tension bar to establish and thereafter maintain the orientation of cooperating disks. When the tension bar is tightened to maintain contact between the lower ends of the disks, however, the contacting edge of the upper disk is pulled up higher on the interior surface of the lower disk. This detrimentally increases the distance between the pinch point and the bottom edge of the lower disk.

SUMMARY OF THE INVENTION

This invention provides several improvements over the known plant stalk pullers. A preferred orientation of the disks of this invention is illustrated in FIG. 6(a). Here, the pinch point between the disks is approximately one-half of an inch, or less, from the exterior circumference of the lower disk. The distance may be as much as three-quarters of an inch, but one-half of an inch, or less is preferred. In this configuration, the resulting bends in the stalk are less than in the known configurations illustrated in FIG. 6(b). As a result, the orientation of FIG. 6(a) pinches the Stalk between the disk and minimizes the bending of the stalk. This allows the stalk to be pulled from the ground, including the root system, thereby producing a complete and thorough removal of the stalks.

Maintenance of the correct orientation of the disks, once established, is important to proper operation of a disked stalk puller. The preferred embodiment of the present invention utilizes a shim in one of the two connecting assemblies to establish the desired relative orientation between the two disks by extending one of the disks slightly more than the other. The shim is a relatively thin piece of metal, or the like. It is the thickness of the shim by which the second disk extends beyond the first disk. Because of the use of the shim, which does not wear or otherwise appreciably deteriorate, the orientation will be maintained even when reoriented (tightened) to compensate for wear of the disks. This is accomplished by using the adjusting tension bar to initially establish the correct orientation between the disks. The orientation is then maintained by tightening the connection assemblies while in this configuration. When wear does occur between the disks and tightening is required, the disk on the non-shimed side is relaxed by loosening the connection bolts on that side. The tension bar is then used to reestablish the correct orientation and pinch point between the two disks. After that orientation is reestablished, the connection bolts are once again tightened and the correct configuration resumed. This beneficially provides consistent pulling action in a system that is easy to use and maintain.

The present invention employs hub housings having lengths of approximately six and three-quarter inches which is greater than that of most known disk pullers. This increased length of the housing, as well as the shaft within the housing, provides a greater resistance to detrimental torquing action within the hub assembly that is inevitably induced during operation.

The preferred embodiment of the present invention employs a forward cant of approximately twenty-two degrees of the disk assembly for pulling stalks. Twenty-two degrees has been found to be advantageous, but the improved pulling action of the present invention may be realized when that orientation varies by several degrees. Furthermore, because the approximately twenty-two degree orientation is preferred during all stalk pulling operations, it is permanently established by welding the appropriate mounting components into that position.

The vertical and horizontal members of the mounting assembly of the invention are constructed from solid metal bar. It is important that the components of the connecting assembly be sufficiently stout and resistant to bending to maintain the set orientation of the assembly during operation. If less substantial tubulars are used, bending may result and proper orientation will not be maintained. This will result in increased wear, as well as reduced pulling efficiency. The use of solid metal bar may, however, be more expensive and therefore not utilized by competitors.

It has been found that driving cleats may be used only on one of the disks; preferably the lower disk. This will still drive the disks as the ground is traversed and the contact at the pinch point will cause the other, non-cleated disk to rotate in unison with the cleated disk.

The bar connection assembly, through the unique shape of the bar connection plate, establishes a secure connection of the pulling assembly to the tool bar. The plate prevents twisting, or "yaw" with respect to the tool bar. That is, the pulling assembly is braced against twist toward the top and bottom of the tool bar, as well as twisting toward the ends of the tool bars. The curved segments of the plate further enhance the resistance to twist and yaw by more surely fixing the positioning of the plate with respect to the tool bar.

It is an object of this invention to provide a plant stalk pulling device that includes a paired disk pulling assembly connected to a tool bar by an inverted T-shaped mounting assembly. The paired disk pulling assembly has two concave disks. Those disks are oriented to engage one another at a pinch point so that the engagement occurs at a circumferential edge of a first of the disks and an interior face of a second of the disks. The inverted T-shaped mounting assembly includes a vertical member connected to the tool bar at an upper end of the vertical member and a horizontal member connected to a lower end of the vertical member so that two distal ends of the horizontal member each project away from the vertical member. Two disk extension arms are connected to and project below the horizontal member and each of the arms has a disk connected at a lower distal end. A first of the extension arms is connect by an adjustable connecting assembly to the horizontal member proximate to one of the two distal ends of the horizontal member and a second of the extension arms is connect to the horizontal member proximate to the other of the two distal ends of the horizontal member. The horizontal member is oriented so that the paired disk pulling assembly is canted forward so that a line extending from a center point of either of the disks to the pinch point departs from vertical at approximately twenty-two degrees. The extension arms are spaced upon the horizontal member so that the pinch point is established between the two disks. Furthermore, the horizontal member, the vertical member, and the disk extension arms are constructed from solid metal bar lengths. The location of the pinch point is established upon the interior face of the second disk by the interstitial placement of an arm extending shim in the adjustable connecting assembly by which the second disk is connected to the horizontal member. The location of the pinch point is less than three quarters of an inch from a circumferential edge of the second disk. A top end of the vertical member is fixed to a bar connection plate. The bar connection plate has a width greater than the width of the vertical member and the plate is adjustably connected in face-to-face orientation with the tool bar by a bar connection assembly. The greater width of the plate provides a more stable connection to the tool bar than direct connection of the vertical member to the tool bar. The connection plate has curved segments that extend above and below the tool bar thereby restraining relative movement of the plate with respect to the bar when the bar connection is tightened. Each of the disks is mounted on a shaft for rotation relative to the respective extension arms. A distal end of the shaft is threaded; so is a center hole of a hub plate which is screwed tightly upon the threaded distal end so that a short portion of the threaded distal end extends beyond the hub. A weld is placed between the threaded extension and the hub plate so that as the weld cools and contracts, the connection between the plate and the shaft tightens and becomes more secure. There is a recessed lip about an outer circumference of the hub plate and the disk has an inner circumference which matingly engages the recessed lip. A ring is positioned adjacent to the disk so that a portion of the disk is sandwiched between the lip and the ring. There are bolt apertures through each of the hub plate, the disk, and the ring. The apertures are arranged in alignment so that connecting bolts may be inserted therethrough and tightened therein. In one embodiment, cleats are connected to and extend away from an exterior face of the second disk. Each cleat is positioned proximate to an exterior circumferential edge of the second disk and are radially oriented away from a center of the second disk so that the cleats engage the soil as the pulling assembly progresses across the ground's surface. In another embodiment, cleats are additionally connected to and extend away from an exterior face of the first disk.

The steps for use of the invention include orienting a paired disk pulling assembly comprising two concave disks so that the two disks engage one another at a pinch point and so that the engagement occurs at a circumferential edge of a first of the disks and an interior face of a second of the disks. Also, fixing of the orientation of the two disks so that the location of the pinch point is less than three quarters of an inch from a circumferential edge of the second disk is accomplished. The paired disk pulling assembly is mounted to a tool bar so that the pulling assembly is canted forward so that a line extending from a center point of either of the disks to the pinch point departs from vertical at approximately twenty-two degrees. The pulling assembly is run along the crop row so that the plant stalks are pinched between the disks and pulled from the ground without breaking the stalk at the pinch point. Still further, the step of mounting the paired disk pulling assembly further includes utilizing a single vertical member to extend both disks below the tool bar by fixing a top end of the vertical member to a connection plate having a greater width than the vertical member, The plate is connected in face-to-face contact with the tool bar so that movement of the vertical member relative to the tool bar is prevented, The proper orientation of the two disks is established by placing an the extending shim interstitially into the adjustable connecting assembly of one of the two disks.

DESCRIPTION OF THE PREFERRED EMBODIMENTS

Figure 1:
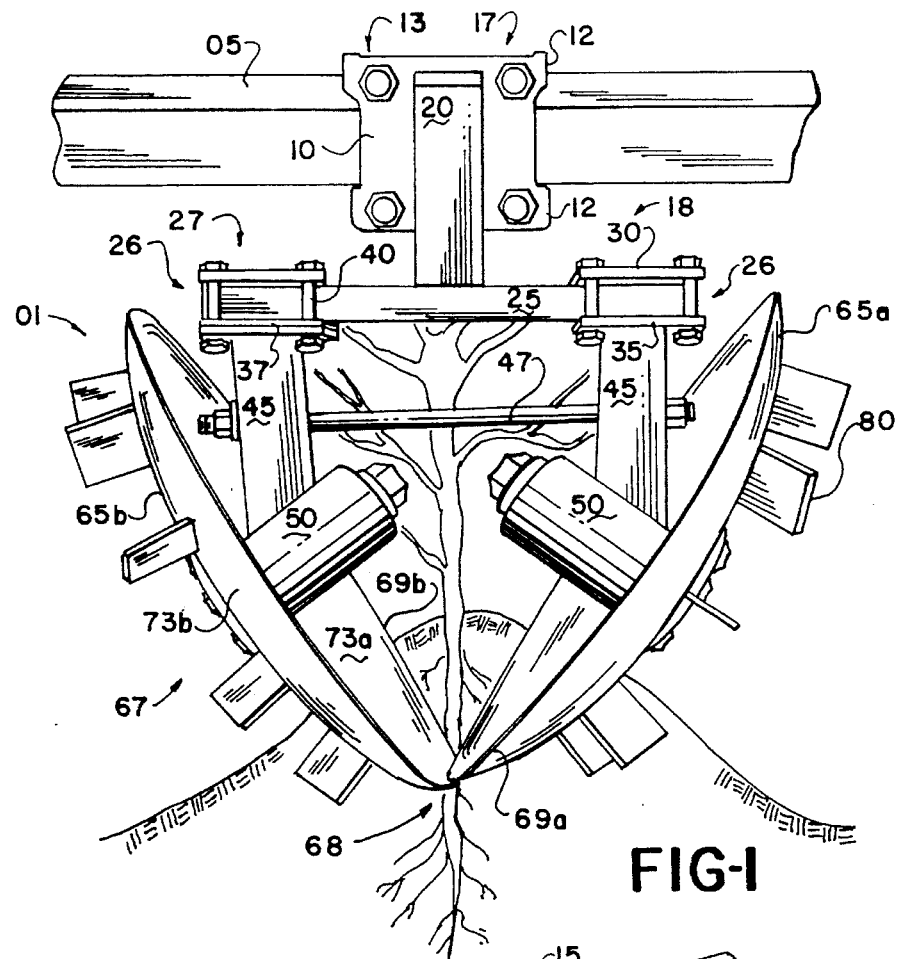
FIG. 1 is a perspective view of the stalk pulling apparatus disposed into the ground during operation.
Figure 2:
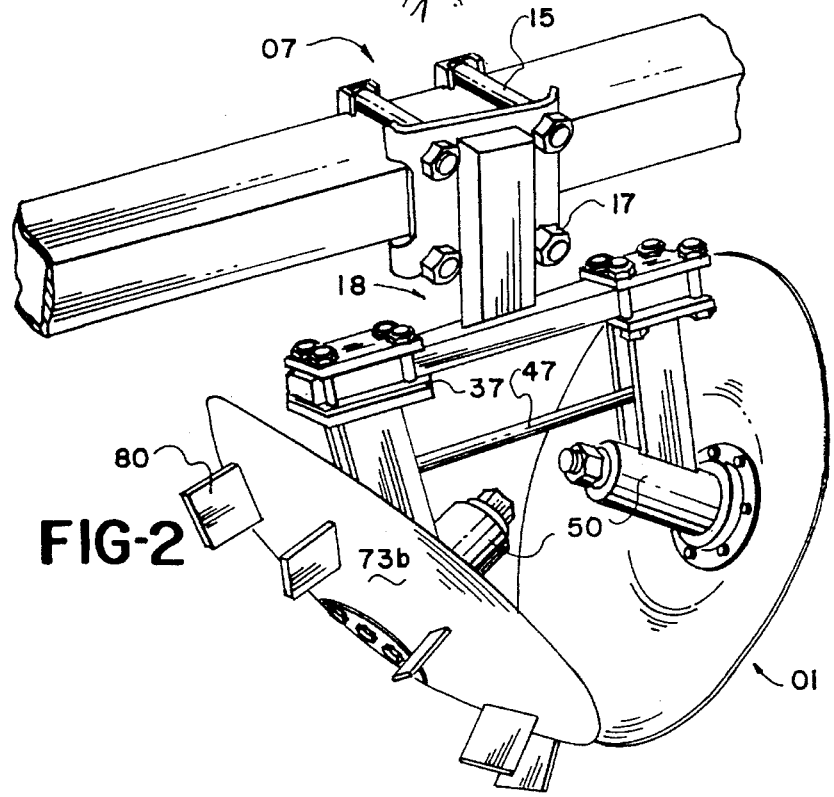
FIG. 2 is a perspective view of the stalk pulling apparatus.
Figure 3:
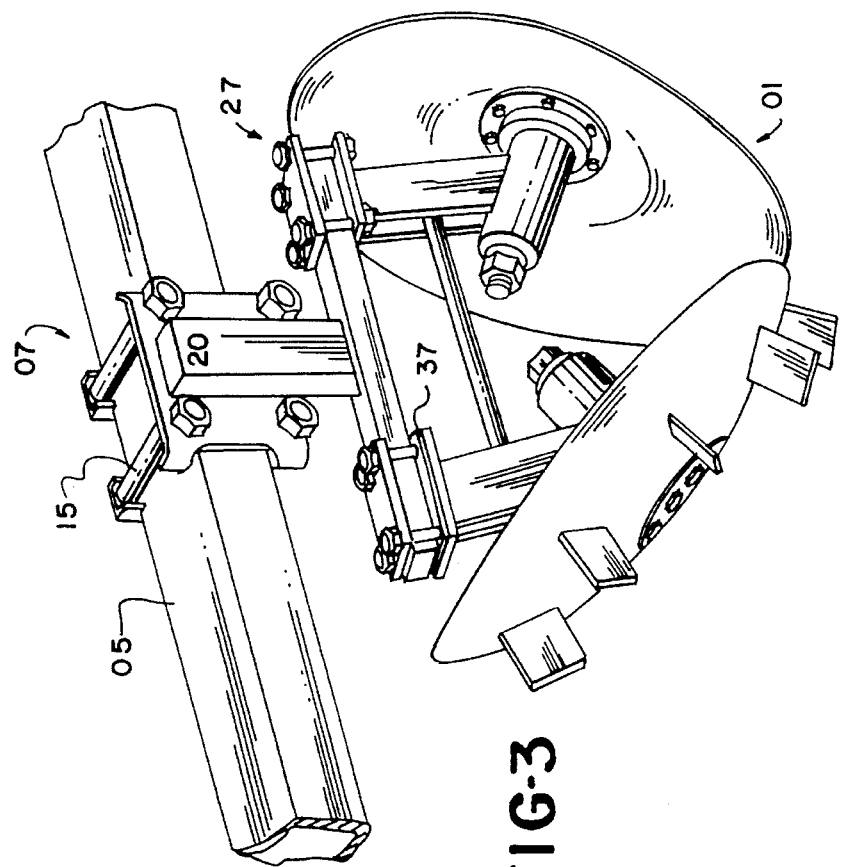
FIG. 3 is a perspective view of a series of stalk pullers mounted upon a tool arm in a forward and rearward alternating pattern.
Figure 3:
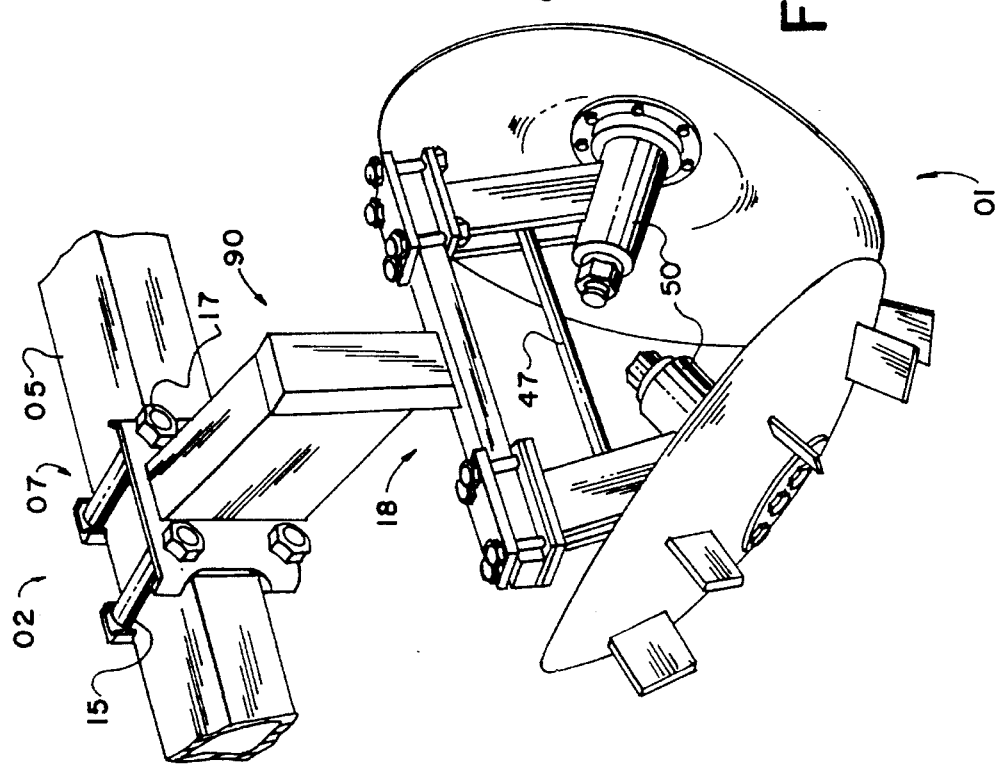
Figure 4:
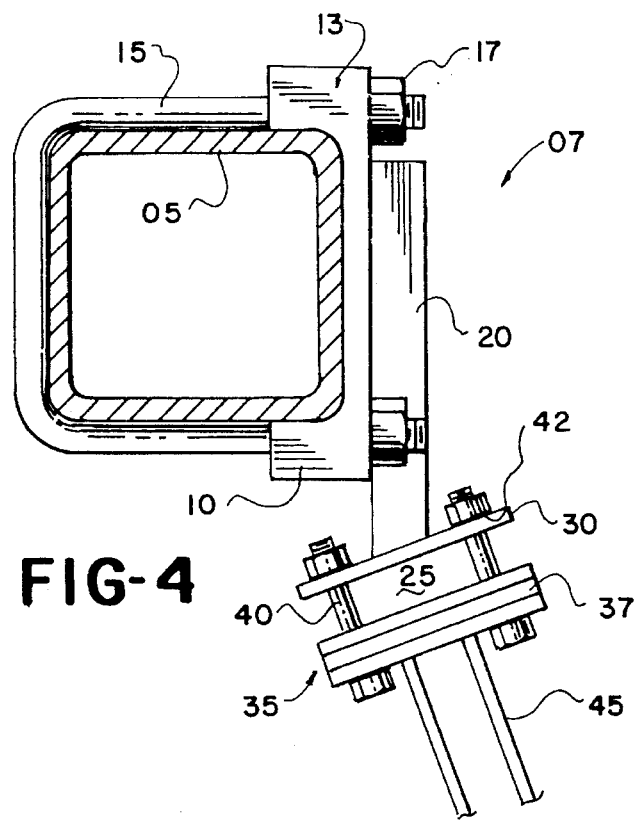
FIG. 4 is an elevational side view of the disk mounting assembly.
Figure 5:
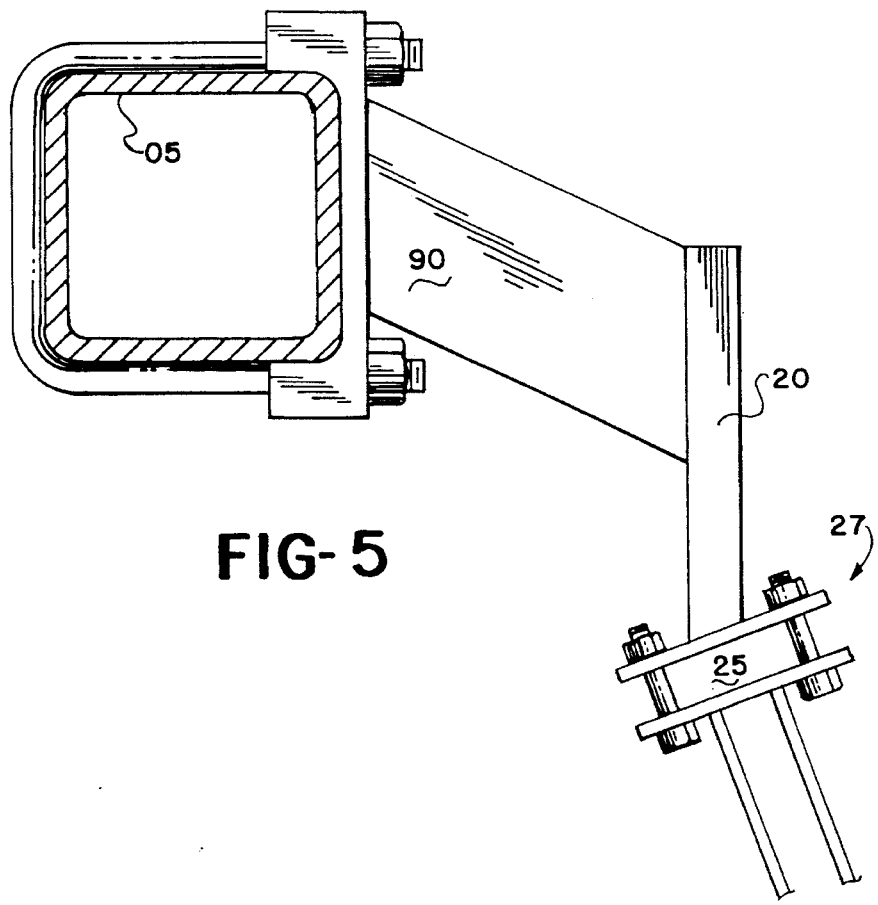
FIG. 5 is an elevational side view of the back extension assembly.
Figure 6A:
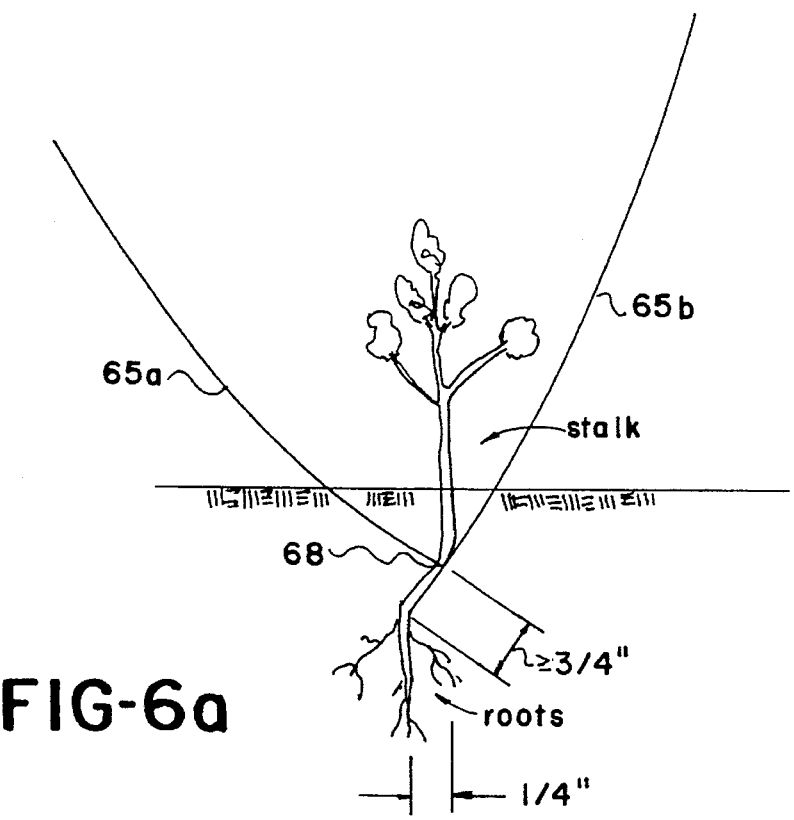
FIG. 6 is a schematic view of bottom end of the overlapping disks; (a) being illustrative of proper orientation of the disks to affect a pulling action on the plant stalk, and (b) being illustrative of improper orientation of the disks that results in breakage of the FIG. 7 is partial sectional and partial cut-away view of the bearing assembly.
Figure 6B:
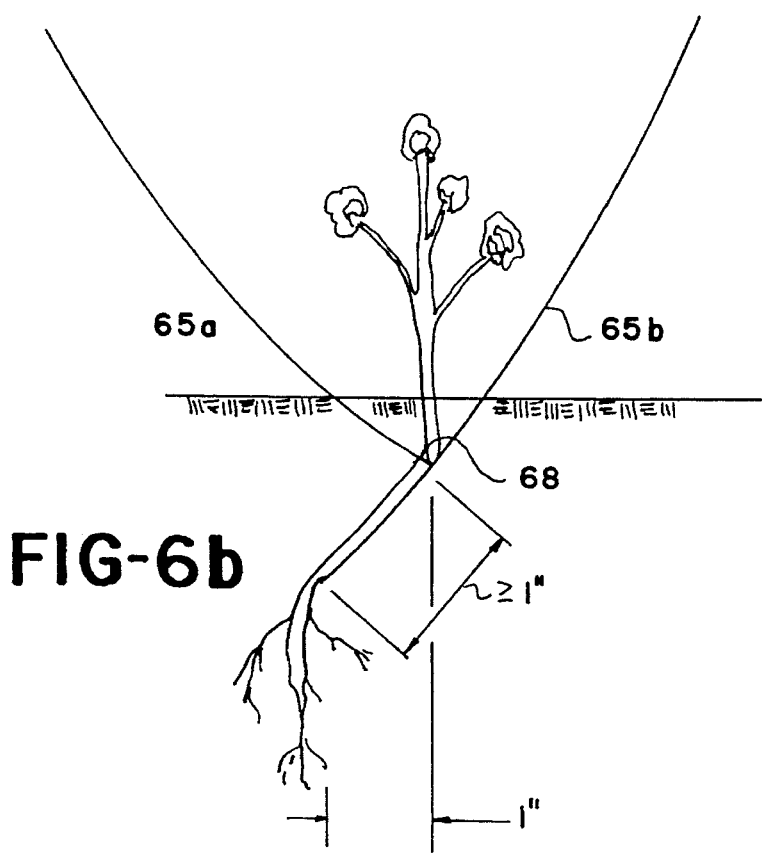
Figure 7:
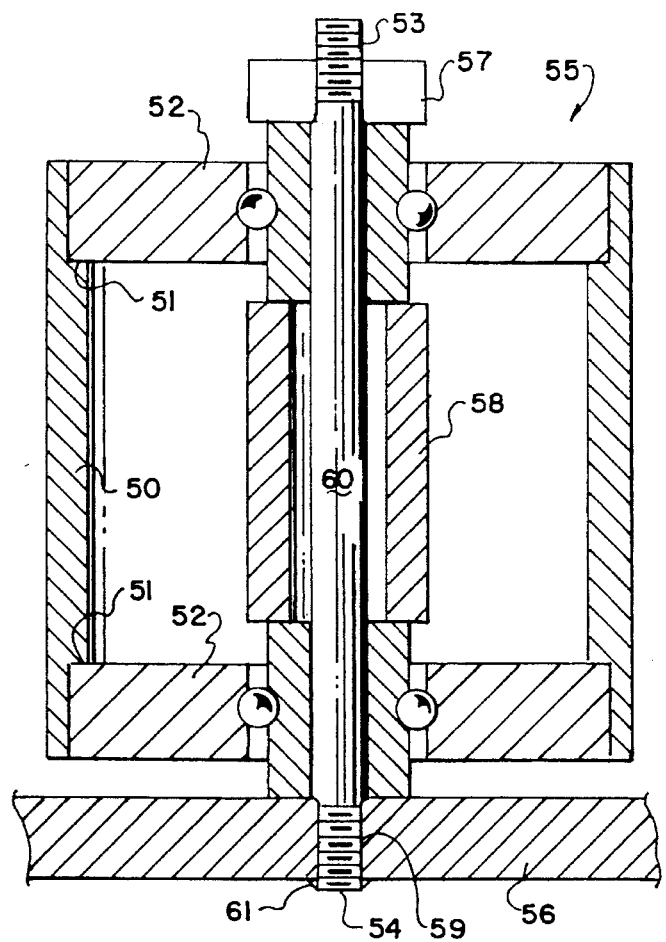

Referring to FIGS. 1 and 2, a plant stalk pulling device 02 having individual paired disk pulling assemblies 01 may be seen. FIG. 3 shows a series of the pulling assemblies 01 mounted upon a tool bar 05. In the present invention, each pulling assembly 01 constitutes an agricultural implement. The tool bar 05 is connected to a tractor (not illustrated) so that a longitudinal axis of the tool bar 05 is transverse to the direction of travel of the tractor. In this configuration, multiple implements may be attached along a length of the bar 05 so that several crop rows may be manipulated upon a single pass of the tractor.

The tool bar 05 may be constructed from any suitable length of bar. There are, however, several common bar sizes which are considered standard in the industry. Those common bar sized include tubular bars having varying lengths and rectangular cross-sectional shapes with dimensions of 4"×4", 4"×7", and 7"×7". As would be expected, the larger bar sizes are stronger and capable of carrying larger implements and resisting greater drag than the smaller bars. In some cases, the smaller bars may be used, but will have to be braced to another tool bar for reinforcement purposes. In the rectangular cross-sectional configuration of the bar 05 described above, there are top and bottom exterior surfaces of the bar 05, each of which are substantially horizontal planes and approximately parallel to the ground. There are also front and back exterior surfaces which are substantially vertical planes generally perpendicular to the ground.

Spacing of the individual pulling assemblies 01 along the length of the tool bar 05 will be governed by the spacing of the plant stalks to be pulled. Common distances between row crops are 30, 32, 36, 38 and 40 inches. As a result, it is necessary that the position of the assemblies 01 be adjustable along the length of the bar 05. Because of the width of each of the presently disclosed assemblies 01, it may be necessary to mount consecutive assemblies 01 alternatingly on the front and back of the bar 05. In this manner, a closer longitudinal spacing along the length of the bar 05 is made possible and allows the more narrow spacings, such as 30 inches, to be accomplished. In this alternating configuration, a back extension assembly 90 is required for the mounting of the assemblies 01 attached to the back of the bar 05. The extension assembly 90 allows closer placement of adjacent assemblies 01, and prevents interference between the same. The extension assembly 90 will be described in further detail hereinafter.

A bar connection assembly 07 is provided which enables the connection of a disk assembly 01 at any point along the length of the bar tool 05. The assembly 07 comprises a bar connection plate 10 which is shaped to fit about an exterior surface of the tool bar 05. In FIG. 1, the plate 10 may be seen at a back exterior surface of the bar 05. An interior surface of the plate 10 is designed to fit flush up against the back exterior surface of the bar 05 in face-to-face abutment. This face-to-face engagement provides a contact surface area between the bar 05 and plate 10 for distribution of forces exchanged between the two parts.

Curved segments 12 of the plate 10 extend above and below the contact area between the bar 05 and the plate 10. The ends of these curved segments 12 bend inward about a top and a bottom surface thereby conforming the shape of the plate 10 to that of the bar 05 creating a snug fit therebetween.

U-bolts 15 are employed to connect the plate 10 to the bar 05 and for sliding engagement therebetween. The bolts 15 are connected in bolt bores 13 through the curved segments 12 of the plate 10 and about the tool bar 05. Ends of the bolts 15 which extend through the bores 13 are threaded for threaded engagement with nuts 17. By tightening the nuts 17 upon the bolts 15, the plate 10 is drawn tight up against the tool bar 05 for fixed engagement therewith. In this manner the plate 10 is securely fastened to the tool bar 05 and provides a platform upon which the remainder of the assembly 01 is mounted. It is, however, contemplated that connection of the plate 10 to the bar 05 may be by any suitable tightenable means.

In the above described configuration, the exterior and backward facing surface of the plate 10 is a planar surface substantially parallel to the back surface of the tool bar 05. Therefore, the plate 10 is likewise oriented substantially in a vertical position.

An inverted T-shaped mounting assembly 18 (T-bar) is connected directly to the exterior surface of the plate 10, and parallel thereto. The T-bar 18 is characterized as being an upside down T-shape because a vertical member 20 extends upward from and perpendicular to a horizontal member 25. In the preferred embodiment, the members 20 and 25 are constructed from solid metal bar stock having a rectangular cross-sectional area. The connection between the plate 10 and the bar 18 is a weld. A top end of vertical member 20 is connected in a parallel orientation to an exterior surface of the plate 10 so that the member 20 extends downward from the plate 10 in a substantially vertical direction. In the preferred embodiment, the attachment of the member 20 to the plate 10 is accomplished by a weld between the two.

A bottom end of the vertical member 20 is connected to the horizontal member 25 so that top and bottom surfaces of the member 25 are not horizontal planes, but instead are oriented at an angle to horizontal. In a preferred embodiment, it has been found to be advantageous for the angle at which the top and bottom surfaces of the member 25 depart from horizontal to be about twenty-two degrees.

Each pulling assembly 01 includes two connecting assemblies 27, one each located proximate to two distal ends 26 of the horizontal member 25. In the preferred embodiment, the connecting assemblies 27 provide a means for connecting a first (upper) disk 65a and a second (lower) disk 65b of the pulling assemblies 01 to the horizontal member 25. In the embodiment shown, each connecting assembly 27 comprises a top plate 30 and a bottom plate 35, each being rectangular in shape. The width of each plate 30 and 35 is greater than the width of the horizontal member 25, where the widths are measured from the front to the back. In this manner portions near the perimeter of the plates 30 and 35 extend beyond front and back edges of the member 25. Located proximate to each corner of the rectangular plates 30 and 35 are connecting bolt holes 42. When installed upon the member 25, the top plate 30 is positioned above the bottom plate 35 so that the bolt holes 42 of the top plate 30 align with the bolt holes 42 of the bottom plate 35. In this configuration, the plates 30 and 35 are oriented in a parallel, but non-horizontal manner, with the member 25 sandwiched therebetween. Headed connecting bolts 40 are then inserted through the aligned holes 42 so that in the preferred embodiment, there are four bolts per connecting assembly 27.

One or more adjusting shim 37 may be positioned between a top surface of the bottom plate 35 and a lower surface of the horizontal member 25. Nuts are connected to threaded ends of the bolts 40 and tightened thereupon. Typically, shims 37 will only be added to one of the two connecting assemblies 27 of the pulling assembly 01 as shown in FIG. 3. The affect of adding the shim 37 is an extension of the bottom plate 55 a distance below the lower surface of the horizontal member 25 generally equal to the thickness of the shim 37.

A disk (hub) extension arm 45 is fixedly connected to a lower surface of each bottom plate 35. It is contemplated that the arm 45 may be constructed from any suitable metal bar having varying cross-sectional shapes. As illustrated, the arm 45 has an "I" cross-sectional shape. In the preferred embodiment, a top end of the arm 45 is welded to the bottom plate so that a longitudinal axis of the arm 45 is perpendicular to the planar lower surface of the bottom plate 35. As a result, the longitudinal axis of the arm 45 therefore departs about twenty-two degrees from vertical because of its fixed square relative orientation to the bottom surface of the horizontal member 25 which departs about twenty-two degrees from horizontal.

In the illustrated embodiment, a tension bar 47 is connected between the two extension arms 45. The tension bar 47 is capable of applying varying degrees of tension between the two extension arms 45, thereby providing means for minutely adjusting the relative orientation of the arms 45 as well providing additional stability to the pulling assembly 01, if needed during operation. In the illustrated embodiment, tension is generated by the application of a tightening nut to threaded portions along the length of the tension bar 47.

A bearing hub housing 50 is connected to a lower distal end of the extension arm 45. In the preferred embodiment, the hub housing 50 is cylindrically shaped and attached by a weld to the arm 45. The connection of the housing 50 to the arm 45 positions a longitudinal axis of the housing 50 so that about a thirty-seven degree angle is created at the intersection of the longitudinal axis with a plane of the lower surface of the horizontal member 35. It should be appreciated that this approximately thirty-seven degree measurement does not occur in a vertical plane, but instead in a plane that is perpendicular to the plane of the lower surface of the horizontal member 35 and therefore in a plane offset approximately twenty-two degrees from vertical.

The bearing hub housing 50 is constructed from one-half inch walled tubing and contains therein a sealed bearing package 55. A lip 51 is cut into each end of the housing 50 at the interior surface creating a land into which bearing races 52 are positioned and maintained. The shaft 60 is positioned within the races 52 so that the shaft 60 rotates therein. A top threaded end 53 of the shaft 60 extends out of a top end of the housing 50 and a lower distal end 54 located opposite the threaded top end 53 extends below a bottom end of the housing 50. As will be described below, a hub plate 56 or flange is connected at the lower distal end 54. When a shaft nut 57 is positioned upon the threaded end 53 and tightened thereon, the shaft 60 is securely mounted within the housing 50 by the pulling of the nut 57 and hub plate 56 inward toward the housing 50. To prevent an undesirable bind from being induced on the bearing races 52, a tubular crush sleeve 58 is positioned between, and in abutment with the interior ends of the two respective races 52. Because of the length of the sleeve 58, proper distancing of the races 52 is supported and undue stressing upon the race assemblies 52 is prevented.

A unique connection is formed at the distal end 54 of the shaft 60 between the shaft 60 and hub plate 56. Like the top threaded end 53 of the shaft 60, the lower distal end 54 is also threaded as is a center hole 59 of the hub plate 56. The hub plate 56 is then screwed onto the lower distal end 54 of the shaft 60 so that it is mounted securely thereto. A weld bead 61 is then placed about the tip of the distal end 54 of the shaft 60 which minimally extends beyond the hub plate 56. When the weld 61 cools and contracts, the connection between the hub plate 56 and the shaft 60 is pulled tight. This assures that the shaft 60 and hub plate 56 remain securely connected during operation. By using the screwing feature, a weld 61 is not singularly depended on for securing the parts, as has been previously known in the art.

Figure 8:
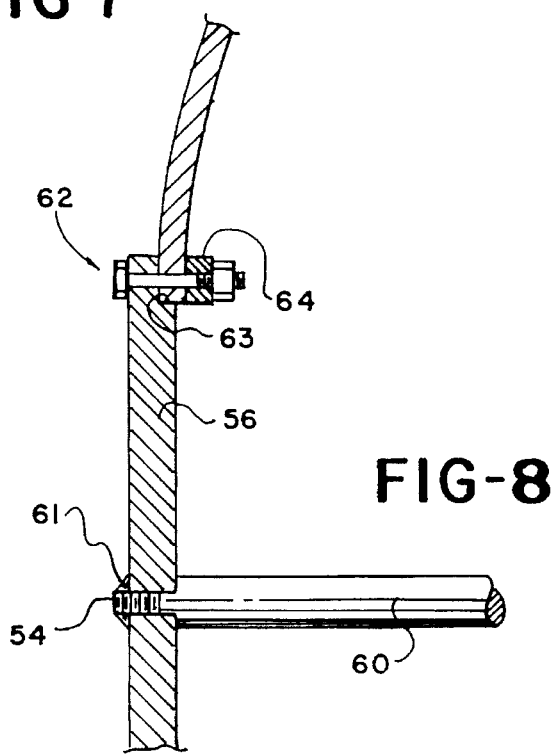
FIG. 8 is partial sectional view of the hub plate, disk, ring, and shaft.

Near the circumference of the hub plate 56 are a series of bolt apertures 62 utilized in the connection of the disk 65 to the hub plate 56. A recessed lip 63 is provided about a top surface of the hub plate 56 to receive a lower surface of the disk 65. Similar apertures 62 are provided in the disk 65 which align with those of the hub plate 56. As seen in FIG. 8, a apertured ring 64 is then placed atop the disk 65 and connecting bolts 66 are tightly installed through the aligned apertures 62. Without the ring 64, the disk 65 will tend to crack about the apertures 62 therein. By using the above described connection between the disk 65 and hub plate 56, the disk 65 is more securely mounted upon the hub plate 56 and replacement of a worn disk 65 is facilitated without removing the shaft 60 from the hub housing 50.

Two disks 65 are connected, one each at the distal ends 54 of the shaft 60. The disks 65 are substantially round with a dish shape; that is, each has a concave interior surface and a convex exterior surface. In the preferred embodiment, the diameter of the disk is about twenty-eight inches. Each disk 65 is fixedly attached to the shaft 60 in a manner that the disk 65 rotates therewith and relative to the hub housing 50. In one embodiment, a disk assembly 67 includes an interior disk plate 70 and an exterior disk plate 71 attached to corresponding surfaces of the disk 65. A secondary exterior disk plate 72 is provided which attaches to the shaft 60. The plate 72 may take the form of a nut or any other means which may be securely attached to the distal most end of shaft 60 for face-to-face engagement with an exterior surface of the disk assembly 67. A shaft nut is provided at a top end of the shaft 60 opposite the disk 65. By tightening both nuts, one on each of the two ends of the shaft 60, the disk 65 is secured for rotation relative to the hub housing 50. In an alternative embodiment, it is contemplated that the connection between the shaft 60 and the disk 65 may be accomplished in a common lug and bolt configuration similar to that employed in the mounting of automobile wheels. The preferred method of attachment of the disk to shaft, however, is that previously described which incorporates the screwable mating and subsequent weld.

At the exterior surface 73 of either disk 65 are cleats 80 which extend outwardly from the exterior surface of the disk 65. Each disk 65 may carry multiple cleats 80, each cleat 80 being equidistantly spaced and proximate to the periphery of the disk 65. As illustrated, each cleat 80 is radially oriented away from a centerline of the disk 65 which is coincident with the centerline of the shaft 60. The purpose of the cleats 80 is to engage the soil as the pulling assembly 01 is drawn across the ground's surface thereby causing the disk 65 to rotate in response thereto.

In the above described configuration, the pulling assembly 01 is substantially symmetrical about a center axis coincident with a longitudinal axis of the vertical member 20; the exception being that one side is lower by the thickness of the shim 37 at all points below the shim 37. It is a result of this greater extension or lowering that allows the disks 65 to overlap in the illustrated manner.

As shown, the first disk 65a engages the second disk 65b so that a circumferencial edge 69a the first disk 65a bears upon the interior face 73a of the second disk 65b at a pinch point 68 that occurs within three-quarters of an inch of a circumferential edge 69b of the second disk 65b. The bearing engagement of the disks 65 is established during assembly of the pulling assembly 01.

As the pulling assembly 01 is drawn over and through the ground, the cleats 80 of each disk 65 engages the soil and causes rotation of each disk 65. Because of the bearing engagement of the disks 65 one to the other, both disks 65 rotate at like speeds as they pass through the ground. As previously discussed, it is contemplated that only one disk, the second disk 65b may be cleated. Because of the backward tilt caused by the angled surfaces of the horizontal member 25, the lowest point of engagement between the disks 65 occurs at the most forward point of engagement. For the remaining portion of an engagement cycle following the initial lowermost engagement, the points of engagement move upward in response to rotation of the disks 65.

Operation of the pulling assemblies 01 is accomplished by aligning each assembly 01 along a row of plant stalks so that the stalks move into the lower portion of the assembly 01 at a forward V-shape created by the oriented disks 65. As the rotating disks 65 engage the stalk, the stalk is pinned between the disks 65 at that point. Because the disks 65 are rotating together, the point of engagement and pinning is maintained throughout the completion of the rotational pinning cycle.

It is important to note that the stalk is not cut by the disks, but is instead secured between the disks 65. As the pinned point of engagement progresses through the rotation cycle, said point moves upward resulting in the stalk being pulled from the ground. As the disks 65 move out of engagement, the stalk is unpinned and allowed to fall to the ground behind the assembly 01 as it progresses along the plant stalk row.

As has been previously described, if the rows of plant stalks are too close together to allow adjacent pulling assemblies 01 to be installed side-by-side with all assemblies 01 mounted upon the back side of the tool bar 05, then alternating assemblies 01 will be mounted at the front of the bar 05. To accomplish mounting of the assembly 01 to the front of the tool bar, the orientation of the bar connection plate 10 is reversed so that the plate 10 is at the front of the bar 05 instead of at the back. Therefore the exterior surface of the plate 10 is facing forward. To attach the pulling assembly 01 to the front of the bar 05, the vertical member 20 is attached to the bar connection plate 10 at a back surface of the member 20, instead of at a front surface as when it is mounted to the back of the bar 05. In this manner, the orientation of the remainder of the assembly 01 is similar to those assemblies 01 mounted at the back and as previously described. The positioning may still require that the assemblies 01 at the back of the bar 05 be further extend in a backward direction to prevent interference between adjacent assemblies 01 mounted at the front of the bar 05. As described above, the backward extension assembly 90 is provided which has the effect of increasing the thickness of the vertical member 20. The increased thickness results in the pulling assembly 01 being mounted further back from the bar 05, but maintains the orientation of the assembly 01 in all other respects.

During operation, the pulling assembly 01 will constantly draw toward the lower disk 65.

If all pulling assemblies 01 on a bar 05 were similarly oriented, that is to say that the shims 37 are uniformly on the same side of the several assemblies 01, a pulling affect to one side would be experienced. To alleviate this detrimental effect, the second disk 65b is on the right of half the assemblies 01 and on the left of half of the assemblies 01 mounted to a bar 05. If an odd number of assemblies 01 are employed, the series will be balanced as closely as possible. For example, if there are seven assemblies 01 being used on a given tool bar 05, three may have the lower disk 65 on the right while four have the lower disk 65 on the left. The slight resultant pull to one side will not be beneficial, but it will likewise not create a noticeable detriment.

Because of the symmetry of the components, it is contemplated that the two disks 65a,b on an assembly 01 may be alternated between the lower and then the higher of the two. Practically speaking, this alternation could be affected at the beginning of each seasonal use. As a result of this type of alternation, the life of the disks 65 will be extended. The wear that results on the lower disk 65 where the lip of the higher disk 65 engages the interior surface of the lower disk 65 will be imparted to both disks 65, instead of just one.

Persons skilled in the art may readily adapt the teachings of the present invention to embodiments and methods differing from those described and illustrated herein. Therefore, the present invention should be limited only in accordance with the appended claims.

I claim:

1. A plant stalk pulling device, comprising:

a paired disk pulling assembly connected to a tool bar by an inverted T-shaped mounting assembly;

said paired disk pulling assembly comprising two concave disks, said two disks oriented to engage one another at a pinch point so that said engagement occurs at a circumferential edge of a first of said disks and an interior face of a second of said disks;

said inverted T-shaped mounting assembly comprising:
 a vertical member connected to said tool bar at an upper end of said vertical member;
 a horizontal member connected to a lower end of said vertical member so that two distal ends of said horizontal member each project away from said vertical member;

two disk extension arms are connected to and project below said horizontal member with one disk connected at lower distal ends of each of said arms;

a first of said extension arms is connected by an adjustable connecting assembly to said horizontal member proximate to one of said two distal ends of said horizontal member and a second of said extension arms is connected to said horizontal member proximate to the other of said two distal ends of said horizontal member;

said horizontal member being oriented so that said paired disk pulling assembly is canted forward so that a line extending from a center point of either of said disks to said pinch point departs from vertical at approximately twenty-two degrees; and said extension arms being spaced upon said horizontal member so that said pinch point is established between said two disks.

2. The plant stalk pulling device as recited in claim 1, further comprising:

said horizontal member, said vertical member, and said disk extension arms being constructed from solid metal bar lengths.

3. The plant stalk pulling device as recited in claim 1, further comprising:

the location of said pinch point being established upon said interior face of said second disk by the interstitial placement of an arm extending shim in said adjustable connecting assembly by which said second disk is connected to said horizontal member.

4. The plant stalk pulling device as recited in claim 3, further comprising:

the location of said pinch point being less than three quarters of an inch from a circumferential edge of said second disk.

5. The plant stalk pulling device as recited in claim 1, further comprising:

a top end of said vertical member being fixed to a bar connection plate;

said bar connection plate having a width greater than a width of said vertical member and said plate being adjustably connected in face-to-face orientation with said tool bar by a bar connection assembly so that said greater width of said plate provides a more stable connection to said tool bar than direct connection of said vertical member.

6. The plant stalk pulling device as recited in claim 5, further comprising:

said connection plate having curved segments that extend above and below said tool bar thereby restraining relative movement of said plate with respect to said bar when said bar connection is tightened.

7. The plant stalk pulling device as recited in claim 1, further comprising:

each of said disks being mounted on a shaft for rotation relative to said respective extension arms;

a distal end of said shaft being threaded;

a center hole of a hub plate being threaded and screwed upon said threaded distal end so that a short portion of said threaded distal end extends beyond said hub; and a weld placed between said threaded distal end and said hub plate so that as said weld cools and contracts, the connection between said plate and said shaft is tightened and secured.

8. The plant stalk pulling device as recited in claim 7, further comprising:

a recessed lip about an outer circumference of said hub plate;

said disk having an inner circumference which matingly engages said recessed lip of said hub plate;

a ring positioned adjacent to said disk so that a portion of said disk is sandwiched between said lip and said ring;

bolt apertures through each of said hub plate, said disk, and said ring; and said apertures being arranged in alignment so that connecting bolts are insertable therethrough and tightenable therein.

9. The plant stalk pulling device as recited in claim 1, further comprising:

cleats connected to and extending away from an exterior face of the second disk;

each cleat being positioned proximate to a circumferential edge of said second disk and radially oriented away from a center of said second disk so that said cleats engage the soil as the pulling assembly progresses across the ground's surface.

10. The plant stalk pulling device as recited in claim 9, further comprising:

cleats connected to and extending away from an exterior face of the first disk; and each cleat being positioned proximate to said circumferential edge of said first disk and radially oriented away from a center of said first disk so that said cleats engage the soil as the pulling assembly progresses across the ground's surface.

11. The plant stalk pulling device as recited in claim 4, further comprising:

a top end of said vertical member being fixed to a bar connection plate;

said bar connection plate having a width greater than a width of said vertical member and said plate being adjustably connected in face-to-face orientation with said tool bar by a bar connection assembly so that said greater width of said plate provides a more stable connection to said tool bar than direct connection of said vertical member.

12. The plant stalk pulling device as recited in claim 11, further comprising:

said connection plate having curved segments that extend above and below said tool bar thereby restraining relative movement of said plate with respect to said bar when said bar connection is tightened.

13. The plant stalk pulling device as recited in claim 12, further comprising:

each of said disks being mounted on a shaft for rotation relative to said respective extension arms;

a distal end of said shaft being threaded;

a center hole of a hub plate being threaded and screwed upon said threaded distal end so that a short portion of said threaded distal end extends beyond said hub; and a weld placed between said threaded distal end and said hub plate so that as said weld cools and contracts, the connection between said plate and said shaft is tightened and secured.

14. The plant stalk pulling device as recited in claim 13, further comprising:

an recessed lip about an outer circumference of said hub plate;

said disk having an inner circumference which matingly engages said recessed lip of said hub plate;

a ring positioned adjacent to said disk so that a portion of said disk is sandwiched between said lip and said ring;

bolt apertures through each of said hub plate, said disk, and said ring; and said apertures being arranged in alignment so that connecting bolts are insertable therethrough and tightenable therein.

15. The plant stalk pulling device as recited in claim 14, further comprising:

cleats connected to and extending away from an exterior face of the second disk;

each cleat being positioned proximate to a circumferential edge of said second disk and radially oriented away from a center of said second disk so that said cleats engage the soil as the pulling assembly progresses across the ground's surface.

16. The plant stalk pulling device as recited in claim 15, further comprising:

cleats connected to and extending away from an exterior face of the first disk; and each cleat being positioned proximate to said circumferential edge of said first disk and radially oriented away from a center of said first disk so that said cleats engage the soil as the pulling assembly progresses across the ground's surface.

17. The plant stalk pulling device as recited in claim 16, further comprising:

said horizontal member, said vertical member, and said disk extension arms being constructed from solid metal bar lengths.

18. A method of pulling plant stalks; comprising the following steps:

orienting a paired disk pulling assembly comprising two concave disks so that said two disks engage one another at a pinch point and so that said engagement occurs at a circumferential edge of a first of said disks and an interior face of a second of said disks;

fixing the orientation of said two disks so that the location of said pinch point is less than three quarters of an inch from a circumferential edge of said second disk;

mounting said paired disk pulling assembly to a tool bar so that said pulling assembly is canted forward so that a line extending from a center point of either of said disks to said pinch point departs from vertical at approximately twenty-two degrees; and running said pulling assembly along a crop row so that the plant stalks are pinched between said disks and pulled from the ground without breaking the stalk at said pinch point.

19. The method of pulling plant stalks recited in claim 18; further comprising:

establishing the orientation of said two disks by placing an arm extending shim interstitially in an adjustable connecting assembly of one of said two disks.

20. The method of pulling plant stalks recited in claim 19; wherein the step of mounting said paired disk pulling assembly further comprises:

utilizing a single vertical member to extend both disks below said tool bar;

fixing a top end of said vertical member to a connection plate having a greater width than said vertical member; and connecting said plate in face-to-face contact with said tool bar so that movement of said vertical member relative to said tool bar is prevented.

* * * * *